US011900514B2

(12) United States Patent
Krs et al.

(10) Patent No.: US 11,900,514 B2
(45) Date of Patent: *Feb. 13, 2024

(54) DIGITAL CONTENT EDITING USING A PROCEDURAL MODEL

(71) Applicant: Adobe Inc., San Jose, CA (US)

(72) Inventors: Vojtech Krs, San Jose, CA (US); Radomir Mech, Mountain View, CA (US); Mathieu Gaillard, West Lafayette, IN (US); Giorgio Gori, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,082

(22) Filed: Jul. 18, 2022

(65) Prior Publication Data

US 2022/0351436 A1 Nov. 3, 2022

Related U.S. Application Data

(63) Continuation of application No. 17/079,915, filed on Oct. 26, 2020, now Pat. No. 11,410,361.

(51) Int. Cl.
*G06T 11/60* (2006.01)
*G06T 3/00* (2006.01)

(52) U.S. Cl.
CPC ............ *G06T 11/60* (2013.01); *G06T 3/0006* (2013.01); *G06T 2200/24* (2013.01)

(58) Field of Classification Search
CPC .... G06T 11/60; G06T 3/0006; G06T 2200/24
See application file for complete search history.

(56) References Cited

U.S. PATENT DOCUMENTS

| 10,134,108 | B2 | 11/2018 | Amirghodsi et al. | |
|---|---|---|---|---|
| 10,636,209 | B1 | 4/2020 | Thaller et al. | |
| 11,410,361 | B2 | 8/2022 | Krs et al. | |
| 2013/0120392 | A1 | 5/2013 | Mech | |
| 2014/0369670 | A1* | 12/2014 | Herfet | G11B 27/031 386/278 |
| 2015/0084989 | A1* | 3/2015 | Laughlin | G06T 19/20 345/633 |
| 2016/0048636 | A1* | 2/2016 | Warner | G06F 3/147 345/633 |
| 2017/0278289 | A1* | 9/2017 | Marino | G06T 7/536 |

(Continued)

OTHER PUBLICATIONS

Yumer et al., "Procedural Modeling Using Autoencoder Networks", 2015, ACM (Year: 2015).*

(Continued)

*Primary Examiner* — YuJang Tswei
(74) *Attorney, Agent, or Firm* — FIG. 1 Patents

(57) ABSTRACT

Procedural model digital content editing techniques are described that overcome the limitations of conventional techniques to make procedural models available for interaction by a wide range of users without requiring specialized knowledge and do so without "breaking" the underlying model. In the techniques described herein, an inverse procedural model system receives a user input that specifies an edit to digital content generated by a procedural model. Input parameters from these candidate input parameters are selected by the system which cause the digital content generated by the procedural model to incorporate the edit.

20 Claims, 11 Drawing Sheets

(56) References Cited

U.S. PATENT DOCUMENTS

| | | | |
|---|---|---|---|
| 2018/0101972 A1* | 4/2018 | Asente | G06T 11/60 |
| 2019/0287224 A1 | 9/2019 | Amirghodsi et al. | |
| 2020/0285464 A1 | 9/2020 | Brebner | |
| 2022/0130086 A1 | 4/2022 | Krs et al. | |
| 2022/0179374 A1* | 6/2022 | Kaberg Johard | G05B 13/027 |

OTHER PUBLICATIONS

Noa Fish et al., "Meta-representation of Shape Families", 2014, ACM (Year: 2014).*

Tao Du et al., "InverseCSG: Automatic Conversion of 3D Models to CSG Trees", 2018, ACM (Year: 2018).*

Huang et al., "Deep-learned generative representations of 3D shape families", 2017, University of Massachusetts Amherst (Year: 2017).*

Leyk, et al, "A Conceptual Framework for Uncertainty Investigation in Map-based Land Cover Change Modelling",2005, Blackwell Publishing (Year: 2005).*

Deussen et al, "Realistic modeling and rendering of plant ecosystems", 1998, ACM (Year: 1988).*

HaibinHuang et al., "Shape Synthesis from Sketches via Procedural Models and Convolutional Networks", 201708, IEEE (Year: 2017).*

Nishida1 et al, "Interactive Sketching of Urban Procedural Models", 201607, ACM (Year: 2016).*

"Final Office Action", U.S. Appl. No. 17/079,915, dated Dec. 29, 2021, 16 pages.

"First Action Interview Office Action", U.S. Appl. No. 17/079,915, dated Nov. 16, 2021, 3 pages.

"Notice of Allowance", U.S. Appl. No. 17/079,915, dated Mar. 30, 2022, 9 pages.

"Pre-Interview First Office Action", U.S. Appl. No. 17/079,915, dated Oct. 21, 2021, 3 pages.

Alhashim, Ibraheem, et al., "Deformation-Driven Topology-Varying 3D Shape Correspondence", ACM Transactions on Graphics, vol. 34, Issue 6, 2015 [retrieved on Oct. 2, 2020]. Retrieved from the Internet <shorturl.at/buGRS>., Oct. 26, 2015, 13 pages.

Aristidou, A, et al., "Inverse Kinematics Techniques in Computer Graphics: A Survey", Wiley Online Linrary, Computer Graphics Forum, vol. 37, Issue 6 [retrieved on Oct. 2, 2020]. Retrieved from the Internet <shorturl.at/tvE03>., Nov. 29, 2017, 24 pages.

Beneš, B., et al., "Guided Procedural Modeling", Computer Graphics Forum, vol. 30, No. 2 [retrieved Oct. 21, 2021]. Retrieved from the Internet <https://doi.org/10.1111/j.1467-8659.2011.01886.x>., Apr. 28, 2011, 10 pages.

Krs, Vojtech, et al., "PICO: Procedural Iterative Constrained Optimizer for Geometric Modeling", IEEE Transactions on Visualization and Computer Graphics [retrieved on Oct. 2, 2020]. Retrieved from the Internet <https://ieeexplore.ieee.org/document/9095367>., May 18, 2020.

Lipp, Markus, et al., "Local Editing of Procedural Models", Wiley Online Library, Computer Graphics Forum vol. 38, Issue 2, [retrieved on Oct. 2, 2020]. Retrieved from the Internet <https://doi.org/10.1111/cgf.13615>., Jun. 7, 2019, 13 pages.

"Adobe Substance 3D", Adobe [retrieved Mar. 24, 2023]. Retrieved from the Internet <https://www.substance3d.com/>., 2 Pages.

Aggarwal, Pranav, et al., "Controlled and Conditional Text to Image Generation using Diffusion PriOR", Cornell University arXiv, arXiv.org [retrieved Apr. 3, 2023]. Retrieved from the Internet <https://arxiv.org/pdf/2302.11710.pdf>., Feb. 23, 2023, 24 Pages.

Brown, Tom, et al., "Language Models are Few-Shot Learners", Advances in Neural Information Processing Systems [retrieved Mar. 27, 2023]. Retrieved from the Internet <https://armatech.us/OpenLanding/Language%20Models%20are%20Few-Shot%20Learners.pdf>., Jul. 22, 2020, 25 Pages.

Cook, Robert L, et al., "A Reflectance Model for Computer Graphics", ACM Transactions on Graphics [retrieved Mar. 24, 2023]. Retrieved from the Internet <https://dl.acm.org/doi/pdf/10.1145/357290.357293>., Jan. 1982, 18 pages.

Demir, ilke, et al., "Proceduralization for Editing 3D Architectural Models", Fourth International Conference on 3D Vision (3DV) [retrieved Mar. 24, 2023]. Retrieved from the Internet <https://www.cs.purdue.edu/homes/bbenes/papers/Demir163DV.pdf>., Oct. 2016, 9 Pages.

Deschaintre, Valentin, et al., "Flexible SVBRDF Capture with a Multi-Image Deep Network", Cornell University arXiv, arXiv.org [retrieved Mar. 24, 2023]. Retrieved from the Internet <https://arxiv.org/pdf/1906.11557.pdf>., Jun. 27, 2019, 14 Pages.

Deschaintre, Valentin, et al., "Guided Fine-Tuning for Large-Scale Material Transfer", Cornell University arXiv, arXiv.org [retrieved Mar. 24, 2023]. Retrieved from the Internet <https://arxiv.org/pdf/2007.03059.pdf>., Jul. 8, 2020, 15 Pages.

Deschaintre, Valentin, et al., "Single-Image SVBRDF Capture with a Rendering-Aware Deep Network", Cornell University arXiv, arXiv.org [retrieved Mar. 24, 2023]. Retrieved from the Internet <https://arxiv.org/pdf/1810.09718.pdf>., Oct. 23, 2018, 15 Pages.

Ellis, Kevin, et al., "Learning to Infer Graphics Programs from Hand-Drawn Images", Advances in neural information processing systems 31 [retrieved Mar. 24, 2023]. Retrieved from the Internet <https://par.nsf.gov/servlets/purl/10088909>., Dec. 2017, 10 pages.

Ellis, Kevin, et al., "Write, Execute, Assess: Program Synthesis with a REPL", Advances in Neural Information Processing Systems 32 [retrieved Mar. 24, 2023]. Retrieved from the Internet <https://proceedings.neurips.cc/paper_files/paper/2019/file/50d2d2262762648589b1943078712aa6-Paper.pdf>., Dec. 8, 2019, 10 Pages.

Ganin, Yaroslav, et al., "Synthesizing Programs for Images using Reinforced Adversarial Learning", arXiv Preprint, arXiv.org [retrieved Mar. 25, 2023]. Retrieved from the Internet <https://arxiv.org/pdf/1804.01118.pdf>., Apr. 3, 2018, 12 pages.

Gao, Duan, et al., "Deep inverse rendering for high-resolution SVBRDF estimation from an arbitrary number of images", ACM Transactions on Graphics, vol. 38, No. 4 [retrieved Mar. 25, 2023]. Retrieved from the Internet <https://gao-duan.github.io/publications/mvsvbrdf/mvsvbrdf_low_resolution.pdf>., Jul. 12, 2019, 15 Pages.

Guarnera, Dar'ya, et al., "BRDF Representation and Acquisition", 37th Annual Conference of the European Association for Computer Graphics: State of the Art Reports [retrieved Mar. 25, 2023]. Retrieved from the Internet <https://eprints.whiterose.ac.uk/161383/1/BRDF_representation_and_acquisition_preprint.pdf>., May 9, 2016, 27 Pages.

Guehl, P, "Semi-Procedural Textures Using Point Process Texture Basis Functions", Computer Graphics Forum, vol. 39, No. 4 [retrieved Mar. 23, 2023]. Retrieved from the Internet <https://publis.icube.unistra.fr/docs/14547/semiproctex_supplemental_4.pdf>., Jul. 20, 2020, 6 Pages.

Guerrero, Paul, et al., "MatFormer: A Generative Model for Procedural Materials", Cornell University arXiv, arXiv.org [retrieved Mar. 25, 2023]. Retrieved from the Internet <https://arxiv.org/pdf/2207.01044.pdf>., Aug. 15, 2022, 12 Pages.

Guo, Y., et al., "A Bayesian Inference Framework for Procedural Material Parameter Estimation", Cornell University arXiv, arXiv.org [retrieved Mar. 25, 2023]. Retrieved from the Internet <https://arxiv.org/pdf/1912.01067.pdf>., Nov. 4, 2020, 12 Pages.

Guo, Jie, et al., "Highlight-Aware Two-Stream Network for Single-Image SVBRDF Acquisition", ACM Transactions on Graphics, vol. 40, No. 4 [retrieved Apr. 10, 2023]. Retrieved from the Internet <https://sites.cs.ucsb.edu/~lingqi/publications/paper_highlight.pdf>., Jul. 19, 2021, 14 Pages.

Guo, Yu, et al., "MaterialGAN: Reflectance Capture using a Generative SVBRDF Model", Cornell University arXiv, arXiv.org [retrieved Mar. 25, 2023]. Retrieved from the Internet <https://arxiv.org/pdf/2010.00114.pdf>., Sep. 30, 2020, 13 Pages.

Heitz, Eric, et al., "A Sliced Wasserstein Loss for Neural Texture Synthesis", Cornell University arXiv, arXiv.org [retrieved Mar. 27, 2023]. Retrieved from the Internet <https://arxiv.org/pdf/2006.07229.pdf>., Mar. 11, 2021, 9 Pages.

Henzler, Philipp, et al., "Generative Modelling of BRDF Textures from Flash Images", Cornell University arXiv, arXiv.org [retrieved Mar. 25, 2023]. Retrieved from the Internet <https://arxiv.org/pdf/2102.11861.pdf>., Sep. 10, 2021, 13 Pages.

Hu, Yiwei, et al., "A novel framework for inverse procedural texture modeling", ACM Transactions on Graphics, vol. 38, No. 6 [retrieved Mar. 25, 2023]. Retrieved from the Internet <https://

(56) References Cited

OTHER PUBLICATIONS graphics.cs.yale.edu/sites/default/files/inverse_procedural_texture_modeling_low-res_0.pdf>., Nov. 8, 2019, 14 Pages.

Hu, Yiwei, et al., "An Inverse Procedural Modeling Pipeline for SVBRDF Maps", Cornell University arXiv, arXiv.org [retrieved Mar. 25, 2023]. Retrieved from the Internet <https://arxiv.org/pdf/2109.06395.pdf>., Sep. 27, 2021, 17 Pages.

Hu, Yiwei, et al., "Controlling Material Appearance by Examples", Cornell University arXiv, arXiv.org [retrieved Mar. 28, 2023]. Retrieved from the Internet <https://arxiv.org/pdf/2206.14970.pdf>., Jun. 30, 2022, 12 Pages.

Hu, Yuanming, et al., "Exposure: A White-Box Photo Post-Processing Framework", ACM Transactions on Graphics, vol. 37, No. 2 [retrieved Mar. 25, 2023]. Retrieved from the Internet <https://web.archive.org/web/20200322160403id_/ https://www.microsoft.com/en-us/research/uploads/prod/2018/01/Exposure.pdf>., Feb. 6, 2018, 23 pages.

Hu, Yiwei, et al., "Node Graph Optimization Using Differentiable Proxies", SIGGRAPH '22: ACM SIGGRAPH 2022 Conference Proceedings [retrieved Mar. 25, 2023]. Retrieved from the Internet <https://arxiv.org/pdf/2207.07684.pdf>., Jul. 24, 2022, 9 Pages.

Johnson, Justin, et al., "Inferring and Executing Programs for Visual Reasoning", Cornell University arXiv, arXiv.org [retrieved Mar. 25, 2023]. Retrieved from the Internet <https://arxiv.org/pdf/1705.03633.pdf>., May 10, 2017, 13 Pages.

Jones, R. Kenny, et al., "ShapeAssembly: Learning to Generate Programs for 3D Shape Structure Synthesis", Cornell University arXiv, arXiv.org [retrieved Mar. 25, 2023]. Retrieved from the Internet <https://arxiv.org/pdf/2009.08026.pdf>., Sep. 17, 2020, 20 Pages.

Kania, Kacper, et al., "UCSG-Net—Unsupervised Discovering of Constructive Solid Geometry Tree", Advances in Neural Information Processing Systems 33 [retrieved Mar. 25, 2023]. Retrieved from the Internet <https://proceedings.neurips.cc/paper/2020/file/63d5fb54a858dd033fe90e6e4a74b0f0-Paper.pdf>., Jun. 2020, 11 Pages.

Kingma, Diederik P, et al., "Adam: A Method for Stochastic Optimization", Cornell University, arXiv Preprint, arXiv.org [retrieved Jun. 15, 2023]. Retrieved from the Internet <https://arxiv.org/pdf/1412.6980.pdf>., Jan. 30, 2017, 15 pages.

Li, Xiao, et al., "Modeling Surface Appearance from a Single Photograph using Self-augmented Convolutional Neural Networks", Cornell University arXiv, arXiv.org [retrieved Mar. 25, 2023]. Retrieved from the Internet <https://arxiv.org/pdf/1809.00886.pdf>., Sep. 4, 2018, 11 Pages.

Liu, Albert Julius, et al., "Simulating the Structure and Texture of Solid Wood", ACM Transactions on Graphics, vol. 35, No. 6 [retrieved Mar. 25, 2023]. Retrieved from the Internet <http://www.cs.cornell.edu/projects/wood/simulating_the_structure_and_texture_of_solid_wood.pdf>., 11 Pages.

Lu, Sidi, et al., "Neurally-Guided Structure Inference", Cornell University arXiv, arXiv.org [retrieved Mar. 25, 2023]. Retrieved from the Internet <http://128.84.21.203/pdf/1906.07304>., Aug. 15, 2019, 11 Pages.

Radford, Alec, et al., "Learning Transferable Visual Models From Natural Language Supervision", Cornell University arXiv, arXiv.org [retrieved Mar. 25, 2023]. Retrieved from the Internet <https://arxiv.org/pdf/2103.00020.pdf>., Feb. 26, 2021, 48 Pages.

Ramesh, Aditya, et al., "Hierarchical Text-Conditional Image Generation with CLIP Latents", Cornell University arXiv, arXiv.org [retrieved Feb. 28, 2023]. Retrieved from the Internet <https://arxiv.org/pdf/2204.06125.pdf>., Apr. 13, 2022, 27 Pages.

Rombach, Robin, et al., "High-Resolution Image Synthesis with Latent Diffusion Models", Cornell University arXiv, arXiv.org [retrieved Mar. 28, 2023]. Retrieved from the Internet <https://arxiv.org/pdf/2112.10752.pdf>., Apr. 13, 2022, 45 Pages.

Sharma, Gopal, et al., "CSGNet: Neural Shape Parser for Constructive Solid Geometry", arXiv Preprint, Cornell University, arXiv.org [retrieved Mar. 25, 2023]. Retrieved from the Internet <https://arxiv.org/pdf/1712.08290.pdf>., Mar. 31, 2018, 16 pages.

Shi, Liang, et al., "Match: differentiable material graphs for procedural material capture", Association for Computing Machinery [retrieved Mar. 25, 2023]. Retrieved from the Internet <https://dspace.mit.edu/handle/1721.1/134067>., 2020, 16 Pages.

Št'ava, O., et al., "Inverse Procedural Modeling by Automatic Generation of L-systems", Computer Graphics Forum, vol. 29, No. 2 [retrieved Mar. 25, 2023]. Retrieved from the Internet <https://citeseerx.ist.psu.edu/document?repid=rep1&type=pdf&doi=a70b4ca28dd43b0747d0692aff2c5d645b4f6414>, Jun. 7, 2010, 10 Pages.

Tian, Yonglong, et al., "Learning to Infer and Execute 3D Shape Programs", Cornell University arXiv, arXiv.org [retrieved Mar. 25, 2023]. Retrieved from the Internet <https://arxiv.org/pdf/1901.02875.pdf>., Aug. 9, 2019, 21 Pages.

Vaswani, Ashish, et al., "Attention Is All You Need", Cornell University arXiv Preprint, arXiv.org [retrieved Mar. 28, 2023]. Retrieved from the Internet <https://arxiv.org/pdf/1706.03762.pdf>., Dec. 6, 2017, 15 pages.

Vinyals, Oriol, et al., "Pointer Networks", Advances in Neural Information Processing Systems 28 [retrieved Mar. 25, 2023]. Retrieved from the Internet <https://proceedings.neurips.cc/paper_files/paper/2015/file/29921001f2f04bd3baee84a12e98098f-Paper.pdf>., Jan. 2, 2017, 9 Pages.

Walke, Homer, et al., "Learning to Infer Shape Programs Using Latent Execution Self Training", Cornell University arXiv, arXiv.org [retrieved Mar. 25, 2023]. Retrieved from the Internet <https://arxiv.org/pdf/2011.13045v1.pdf>., Nov. 25, 2020, 15 Pages.

Walter, Bruce, et al., "Microfacet Models for Refraction through Rough Surfaces", Proceedings of the 18th Eurographics Conference on Rendering Techniques, EGSR'07, Goslar, DEU, Eurographics Association [retrieved on Mar. 28, 2023]. Retrieved from the Internet <shorturl.at/hDEJ1>., Jun. 2007, 12 pages.

Wu, Chenming, et al., "Carpentry compiler", ACM Transactions on Graphics, vol. 38, No. 6 [retrieved Mar. 25, 2023]. Retrieved from the Internet <https://grail.cs.washington.edu/wp-content/uploads/2019/11/wu2019cc.pdf>., 14 Pages.

Xu, Xianghao, et al., "Inferring CAD Modeling Sequences Using Zone Graphs", Cornell University arXiv, arXiv.org [retrieved Mar. 25, 2023]. Retrieved from the Internet <http://128.84.21.203/pdf/2104.03900>., Apr. 20, 2021, 20 Pages.

Ye, Wenjie, et al., "Deep Reflectance Scanning: Recovering Spatially-varying Material Appearance from a Flash-lit Video Sequence", Computer Graphics Forum, vol. 40, No. 6 [retrieved Mar. 25, 2023]. Retrieved from the Internet <https://par.nsf.gov/servlets/purl/10338728>., Aug. 18, 2021, 18 Pages.

Zhou, Xilong, et al., "Adversarial Single-Image SVBRDF Estimation with Hybrid Training", Computer Graphics Forum, vol. 40, No. 2 [retrieved Mar. 25, 2023]. Retrieved from the Internet <https://people.engr.tamu.edu/nimak/Data/EG21_SVBRDF_LoRes.pdf>., Jun. 4, 2021, 11 Pages.

Zhou, Xilong, et al., "TileGen: Tileable, Controllable Material Generation and Capture", Cornell University arXiv, arXiv.org [retrieved Mar. 25, 2023]. Retrieved from the Internet <https://arxiv.org/pdf/2206.05649.pdf>., Jun. 20, 2022, 18 Pages.

Deschaintre, Valentin Mathieu, et al., "US Application as Filed", U.S. Appl. No. 18/329,385, filed Jun. 5, 2023, 71 pages.

* cited by examiner

DIGITAL CONTENT EDITING USING A PROCEDURAL MODEL

RELATED APPLICATIONS

This application is a continuation of, and claims priority to, U.S. patent application Ser. No. 17/079,915, filed Oct. 26, 2020 and titled "Digital Content Editing using a Procedural Model," the disclosure of which is hereby incorporated by reference in its entirety.

BACKGROUND

Procedural modeling is one technique used by digital content systems to generate digital content. Procedural models specify a series of operations (e.g., algorithms) using procedural nodes that when executed using a set of default parameters by a computing device result in generation of digital content that is a subject of the model. Examples of digital content generated by procedural models includes digital images, two-dimensional models, three-dimensional models, and so forth. Procedural modeling has exhibited increased usage in digital movies, animation, and digital images due to the increased efficiency in creating and using a particular item of digital content, over and over.

Consider an example in which a content creator wishes to create a futuristic city landscape having towers, bridges, and arches, and so on. Rather than manually input each instance of these elements, the content creator creates a procedure model (e.g., of an arch) that includes a series of operations that are executable to generate a corresponding instance of an arch. Once written, the content creator then reuses the procedural model to create another instance that is visually different by changing the default parameters within the procedural model. As a result, the procedural model is leveraged to increase efficiency in creating, rendering, and storing digital content.

However, conventional techniques used to create procedural models are implemented as a "black box" such that knowledge of the working and operation of the procedural models is limited to a content creator that made it. This is made even more problematic as the complexity of the procedural model increases to include thousands of operations and procedural nodes, objects that are rendered as a result of those operations (which in some instances are maintained internal to the model), parameters that specify characteristics of the objects, use of coined terms originated by the content creator to name the parameters, nodes, and objects, and so forth. Further, any attempt to edit digital content after generation by the procedure model "breaks" a link to the model. For example, a simple rotation of a generated shape within the digital content may be influenced by several parameters scattered through several procedural nodes. Accordingly, any modification of a final rendering of the digital content from the procedural model is static and as such is not usable nor repeatable by the procedural model again.

SUMMARY

Procedural model digital content editing techniques are described that overcome the limitations of conventional techniques to make procedural models available for interaction by a wide range of users without requiring specialized knowledge and do so without "breaking" the underlying model. In the techniques described herein, an inverse procedural model system receives a user input that specifies an edit to digital content generated by a procedural model. Input parameters from these candidate input parameters are selected by the system which cause the digital content generated by the procedural model to incorporate the edit. In this way, no changes are made to the underlying procedural model, itself, and specialized knowledge is not required in order to determine these input parameters as it is performed automatically and without user intervention by the system.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
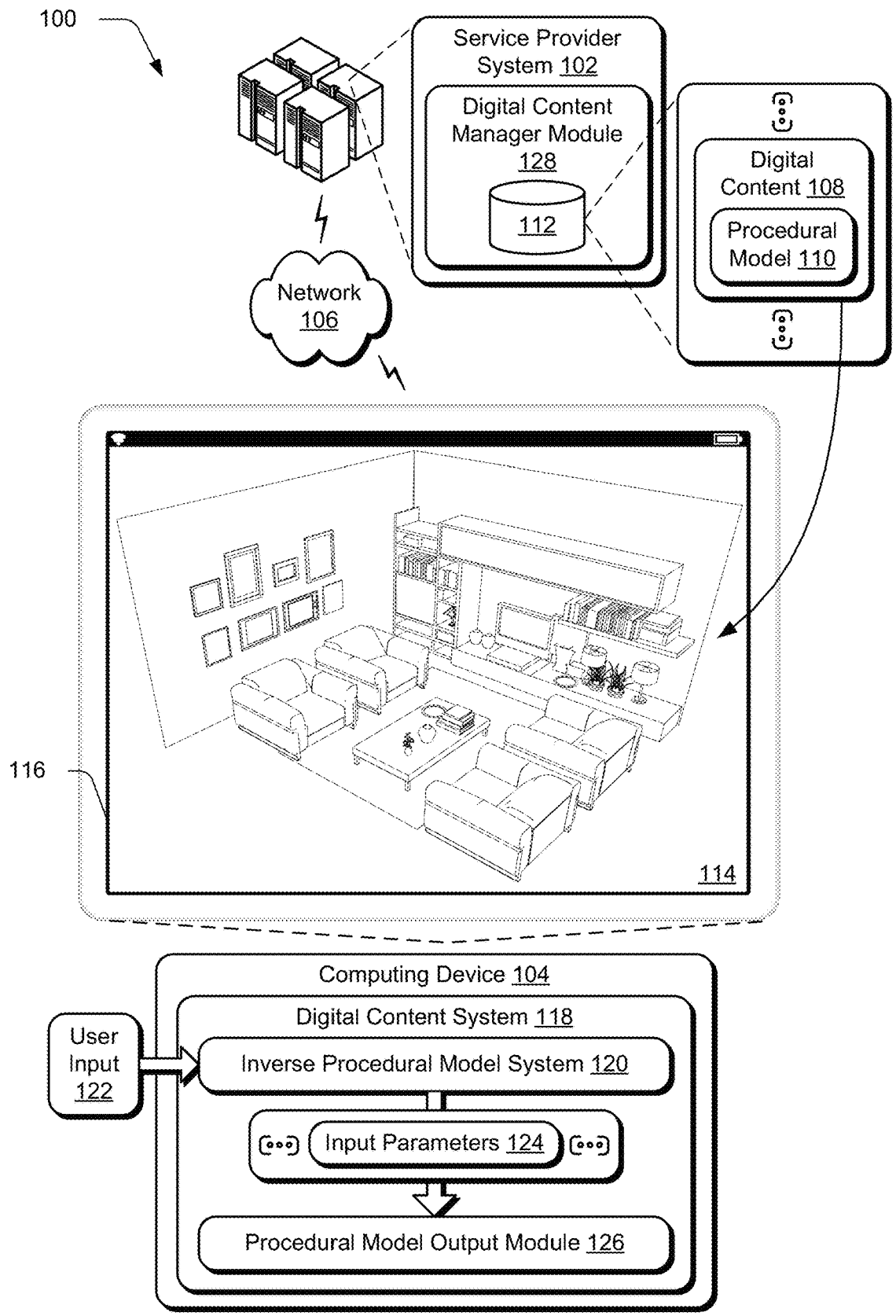
FIG. 1 is an illustration of an environment in an example implementation that is operable to employ digital content procedural model editing techniques described herein.

Procedural modeling is a set of techniques used to automatically generate a variety of digital content, e.g., as two-dimensional and three-dimensional models. Compared to traditional manual modeling techniques, procedural model techniques are fast as well as computationally and storage efficient in that a single model may be used to generate multiple different instances of digital content. However, full use of procedural models is typically limited to users that created the models due to specialized knowledge used to create hundreds and even thousands of procedural nodes, coined terms used to name input parameters and objects within the models, interrelationships between the nodes, and so on.

Accordingly, procedural model digital content editing techniques are described that overcome the limitations of conventional techniques to make procedural models available for interaction by a wide range of users without requiring specialized knowledge and do so without "breaking" the underlying model. In this way, procedural models are made available as a resource to the wide range of users (e.g., as a stock resource), which is not possible using conventional techniques that relied on specialized knowledge in order to edit the models.

In the techniques described herein, an inverse procedural model system receives a user input that specifies an edit to digital content generated by a procedural model. The edit, for instance, is an affine transformation (e.g., rotation, translation, resizing) to one or more objects that form the digital content. The inverse procedural model system then generates a plurality of candidate input parameters over a plurality of iterations. Input parameters from these candidate input parameters are selected by the system which cause the digital content generated by the procedural model to incorporate the edit. In this way, no changes are made to the underlying procedural model, itself, and specialized knowledge is not required in order to determine these input parameters as it is performed automatically and without user intervention by the system.

To do so in one example, the inverse procedural model system generates a simplified representation of the procedural model, which is used to track edits and determine input parameters based on the edits. The inverse procedural model system, for instance, generates a simplified model having bounding objects (e.g., bounding boxes) used to replace/represent objects contained/rendered by the procedural model at respective procedural nodes. A procedural model configured to generate a couch, for instance, includes objects that define arm rests, cushions, back, legs, and so forth. Therefore, the simplified model replaces these objects with bounding objects that approximate an outer boundary of these objects in a simplified manner, and corresponding labels.

This simplified model is used by the inverse procedural model system to track edits made by a user. For example, a user input is received that specifies that the couch cushion is to be made narrower. This user input is applied to the simplified model to form a "target simplified model," which functions as a target of the edit and quantifies a loss. Candidate input features are also generated by the inverse procedural model system and used to generate candidate bounding objects in order to minimize the loss using an optimization function. This is performed by the inverse procedural model system to change the candidate input features in an attempt to minimize a distance between the candidate bounding objects generated by these parameters and the edited bounding objects of the edited simplified model "target" and minimize the loss.

In practice, thousands of iterations may be performed in order to obtain the input parameters. To address this and improve processing efficiency, auto differentiation techniques are also employed by the inverse procedural model system. In an example of auto differentiation, mathematical operations between the input variable are recorded in an expression tree. By traversing this tree from a top-level (with an output variable as a root node) to a bottom level (input variables as the leaf nodes), the contribution of each branch on the derivatives of the output variable is computed with respect to the input variables. As a result, auto differentiation provides increased insight and acts as a guide in determining which specific parameters are to be generated in order to achieve a desired result, e.g., the edit. In practice, use of auto differentiation has made generating and processing these iterations five to six times faster.

Once the input parameters are selected from the candidate input parameters above, these input parameters are directly usable by the procedural model in order to generate the digital content as including the edit. In this way, the input parameters are used without making a change to the underlying procedural model and is not destructive, as is encountered using conventional techniques. Further discussion of these and other examples is included in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ procedural model digital content editing techniques described herein. The illustrated environment 100 includes a service provider system 102 and a computing device 104 that are communicatively coupled via a network 106. Computing devices that implement these entities are configurable in a variety of ways.

A computing device, for instance, is configurable as a desktop computer, a laptop computer, a mobile device (e.g., assuming a handheld configuration such as a tablet or mobile phone as illustrated), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown in some instances, a computing device is also representative of a plurality of different devices, such as multiple servers utilized by a business to perform operations "over the cloud" as described in FIG. 11.

The service provider system 102 includes a digital content manager module 128 that implements a platform that makes digital content 108 generated using procedural models 110 available as a stock resource, which are illustrated as stored in a storage device 112. For example, content creators create digital content 108 generated using procedural models 110 and provide that content to the service provider system 102. The service provider system 102 then makes this digital content 108 available via the network 106 to others, e.g., as part of a subscription, points system, pay-per-use, and so forth. Through use of the editing techniques as described herein, this digital content 108 is editable by the users without modification to the underlying procedural model 110, itself. In this way, the techniques described here overcome conventional challenges that resulted in static models by "breaking" the underlying procedural model 110 and difficulties in determining how to make edits due to the complexity and specialized knowledge used to create the procedural model 110. As a result, the techniques described herein make digital content 108 generated by procedural models 110 available to a wide range of users that previously are not capable of editing this content.

In the illustrated example, the computing device 104 renders digital content 108 using a procedural model 110 in a user interface 114 output by a display device 116. The digital content 108 depicts a living room having a plurality of chairs, books, and picture frames, along with other items typically found in a living room. The procedural model 110 is usable to support generated of repeated instances of digital content. For example, a single procedural model is usable to create the four instances of the chair. Another procedural model is usable to create the eight instances of picture frames on the wall, and so forth. As a result, procedural models increase storage and computational efficiency in the creation of multiple instances of digital content.

However, conventional use of procedural models are typically limited to use of the digital content created by these models "as is" unless modified by the creator of model due to complexity of the models, use of coined terms both for the parameters and objects modified by the parameters, interrelations of the objects, and so forth. A content creator, for instance, upon creation of the procedural model may include fanciful names for objects included in the digital content, parameters used to modify those object, include dependencies between nodes, and so on that are not intuitive to other users that did not create the model.

According, in the techniques described herein a digital content system 118 includes an inverse procedural model system 120 that is configured to receive a user input 122 specifying an edit to be made to the digital content 108. Based on this edit, the inverse procedural model system 120 determines input parameters 124 automatically and without user intervention that, when received as an input by the procedural model 110, causes the digital content 108 to reflect the edit. The input parameters 124, for instance, are passed to a procedure model output module 126 that is configured to execute the procedural model 110 using the input parameters 124 to render the digital content 108. In this way, the digital content 108 is edited without making changes to the underlying procedural model 110 and is non-destructive thereby enabling continued use of the procedural model 110 for generating other instances of the digital content as before. Further discussion of these and other examples is included in the following sections and shown in corresponding descriptions.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Content Editing Using a Procedural Model

Figure 2:
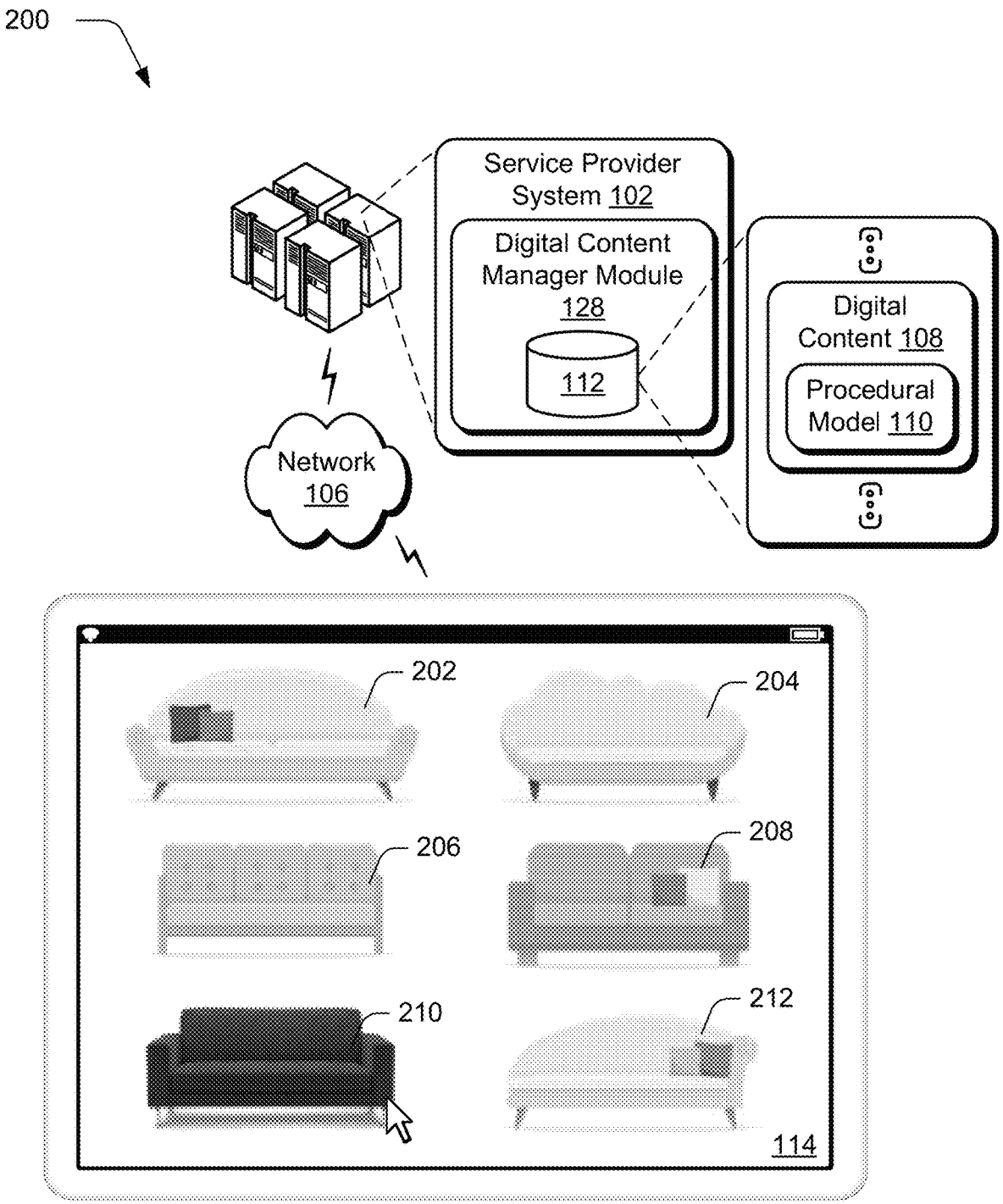
FIG. 2 depicts an example implementation of selection of a procedural model from a plurality of representations of procedural models via a platform implemented by a service provider system.
Figure 3:
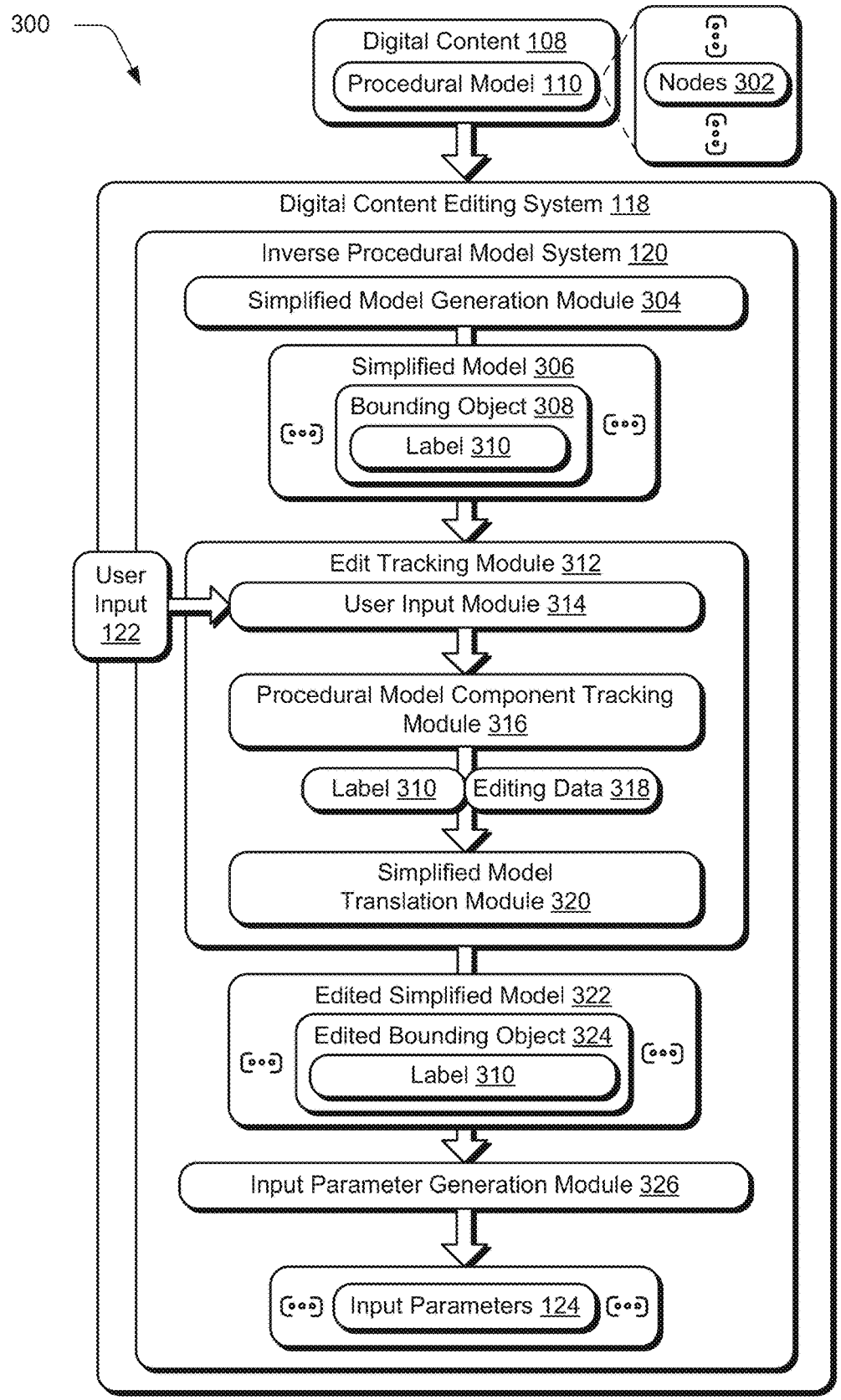
FIG. 3 depicts a system showing operation of the inverse procedural model system in greater detail as employing a simplified model to track edits to digital content.
Figure 4:
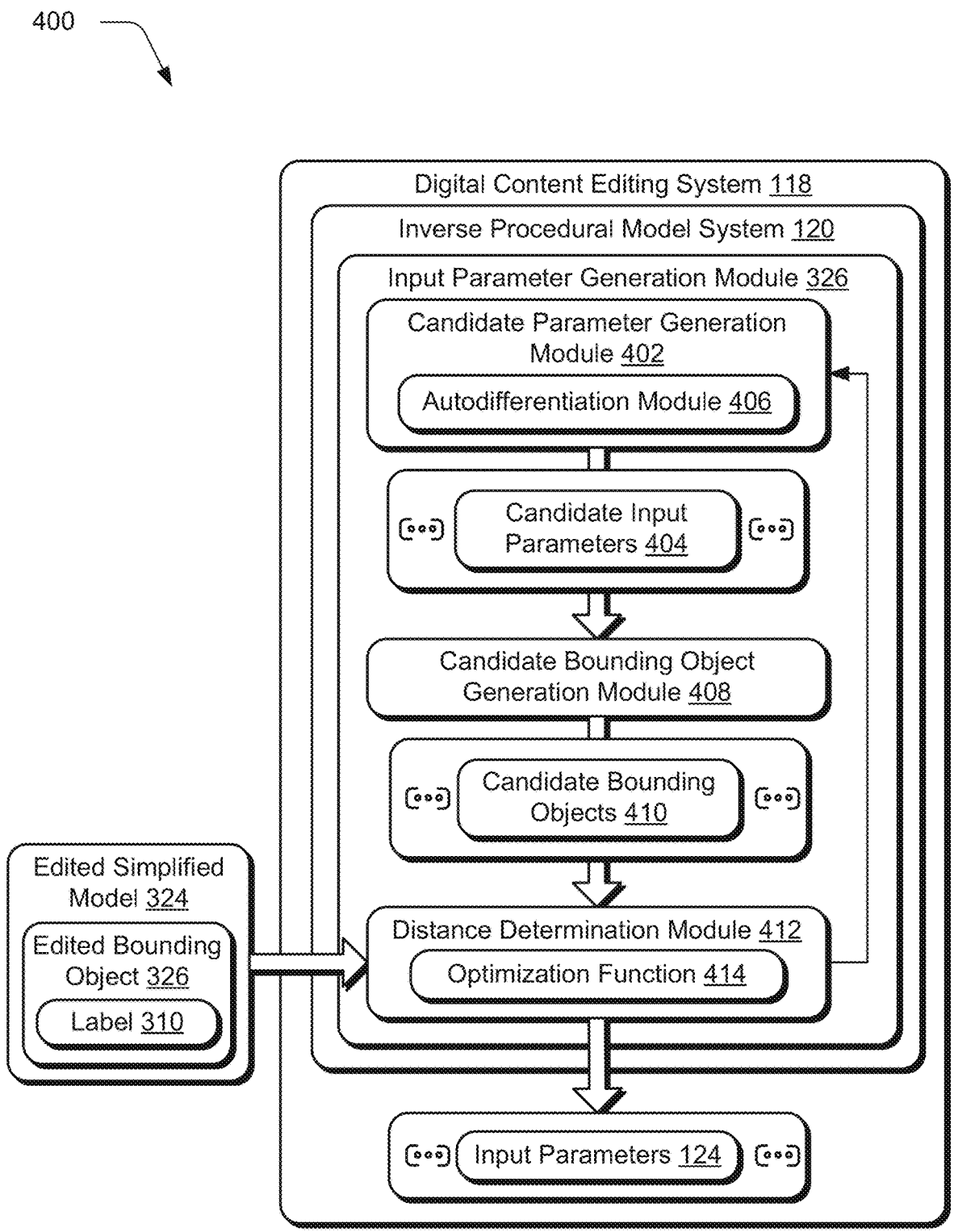
FIG. 4 depicts a system in an example implementation showing operation of the inverse procedural model system as generating candidate input parameters and candidate bounding objects in order to select input parameters to cause the edit to be applied to digital content generated by the procedural model.
Figure 5:
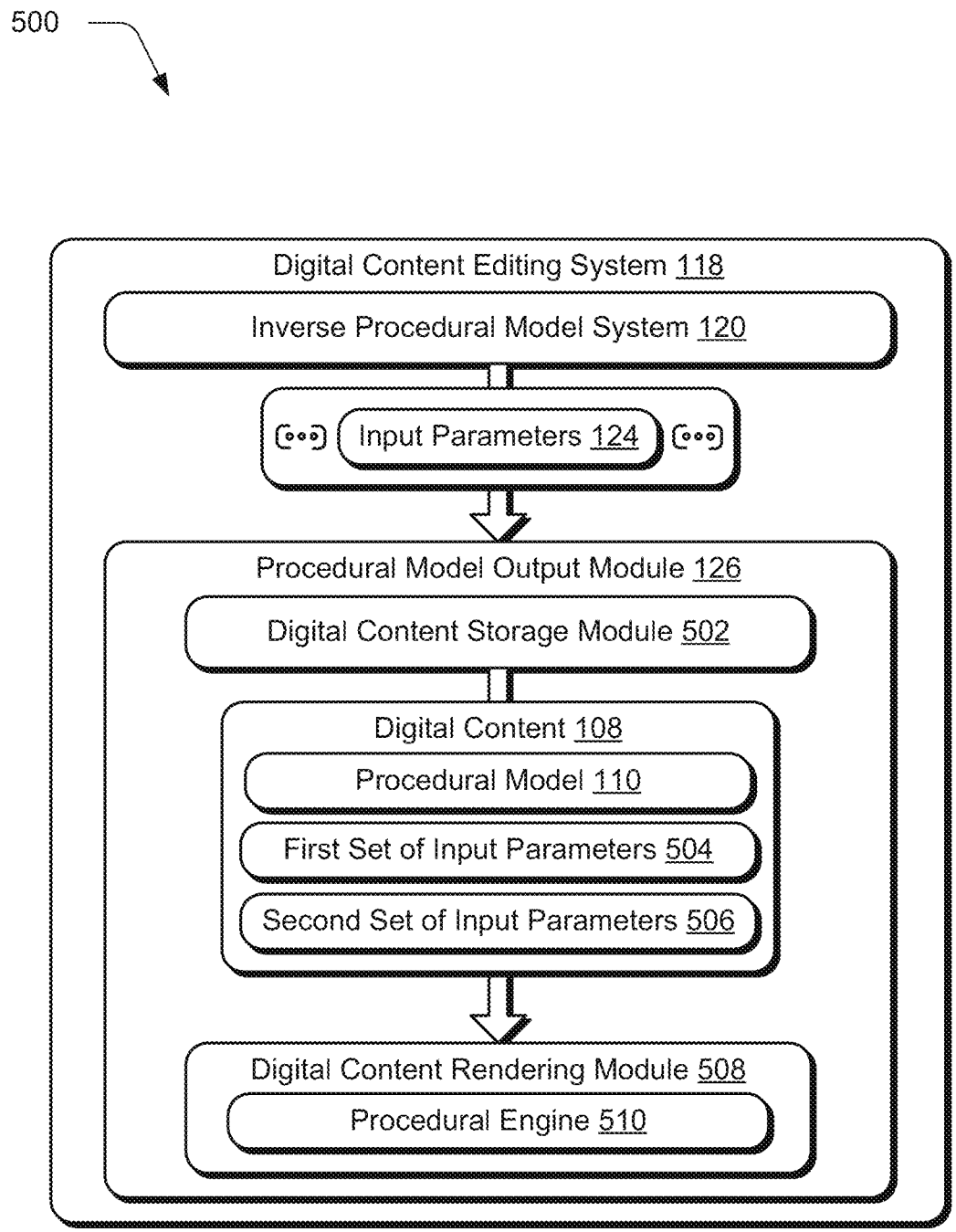
FIG. 5 depicts a system in an example implementation showing operation of the procedural model output module to store and render the procedural model.

FIG. 2 depicts an example implementation 200 of selection of a procedural model from a plurality of representations of procedural models via a platform implemented by a service provider system. FIG. 3 depicts a system 300 showing operation of the inverse procedural model system 120 in greater detail as employing a simplified model to track edits to digital content. FIG. 4 depicts a system 400 in an example implementation showing operation of the inverse procedural model system 120 as generating candidate input parameters and candidate bounding objects in order to select input parameters to cause the edit to be applied to digital content generated by the procedural model. FIG. 5 depicts a system 500 in an example implementation showing operation of the procedural model output module 126 to store and render the procedural model.

Figure 6:
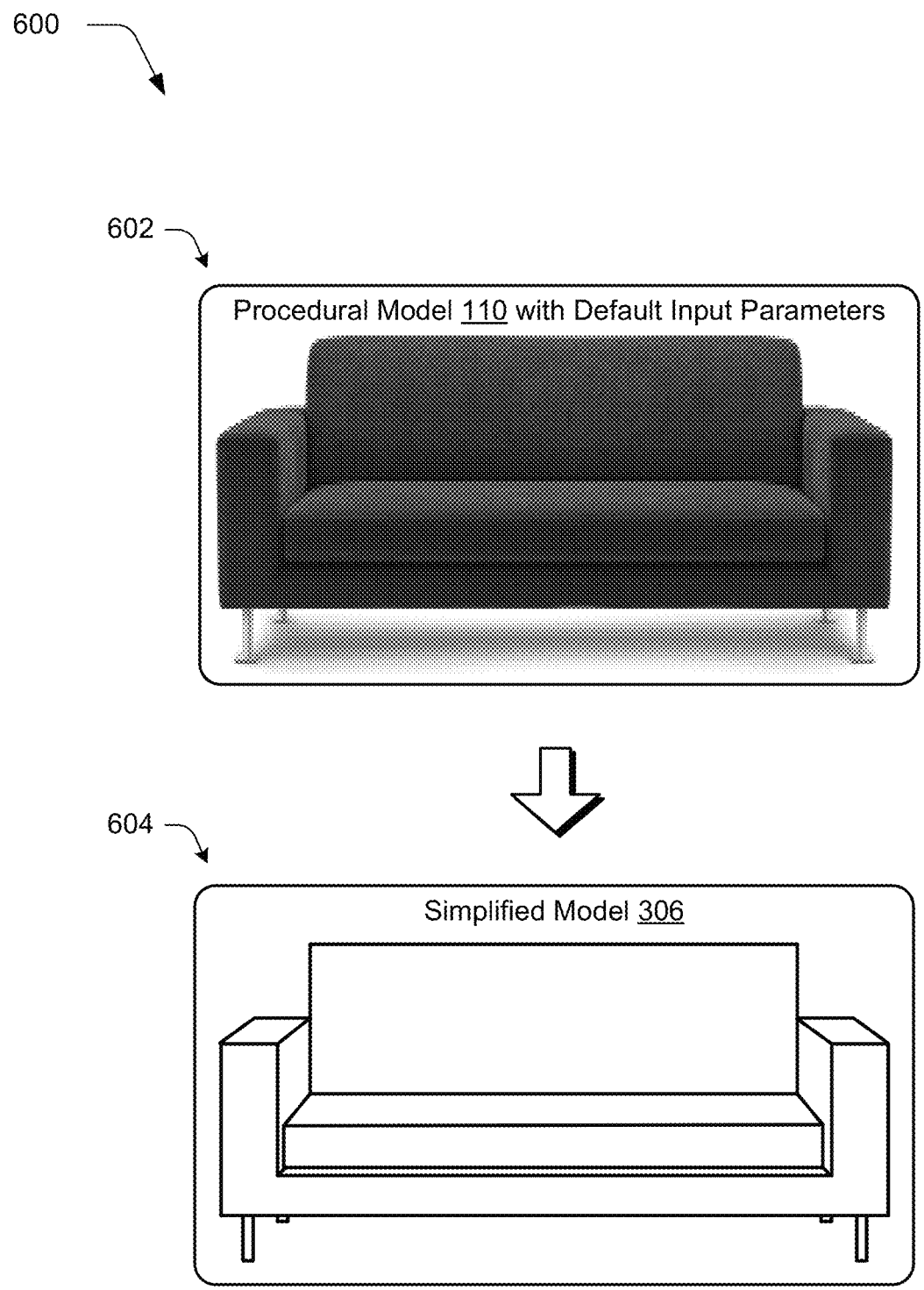
FIG. 6 depicts an example of generation of a simplified model from a procedural model.
Figure 7:
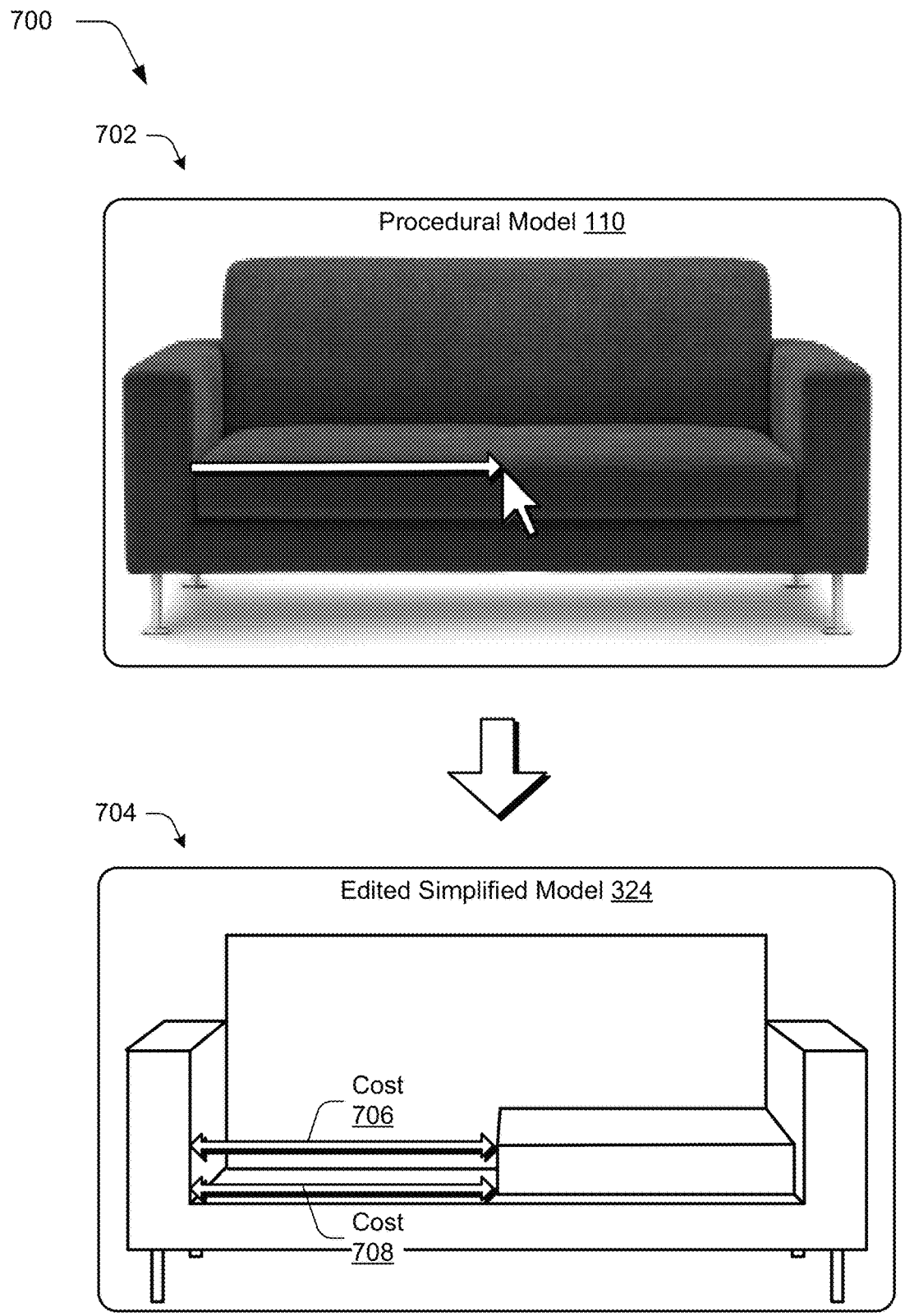
FIG. 7 depicts an example of editing tracking using the simplified model of FIG. 6.
Figure 8:
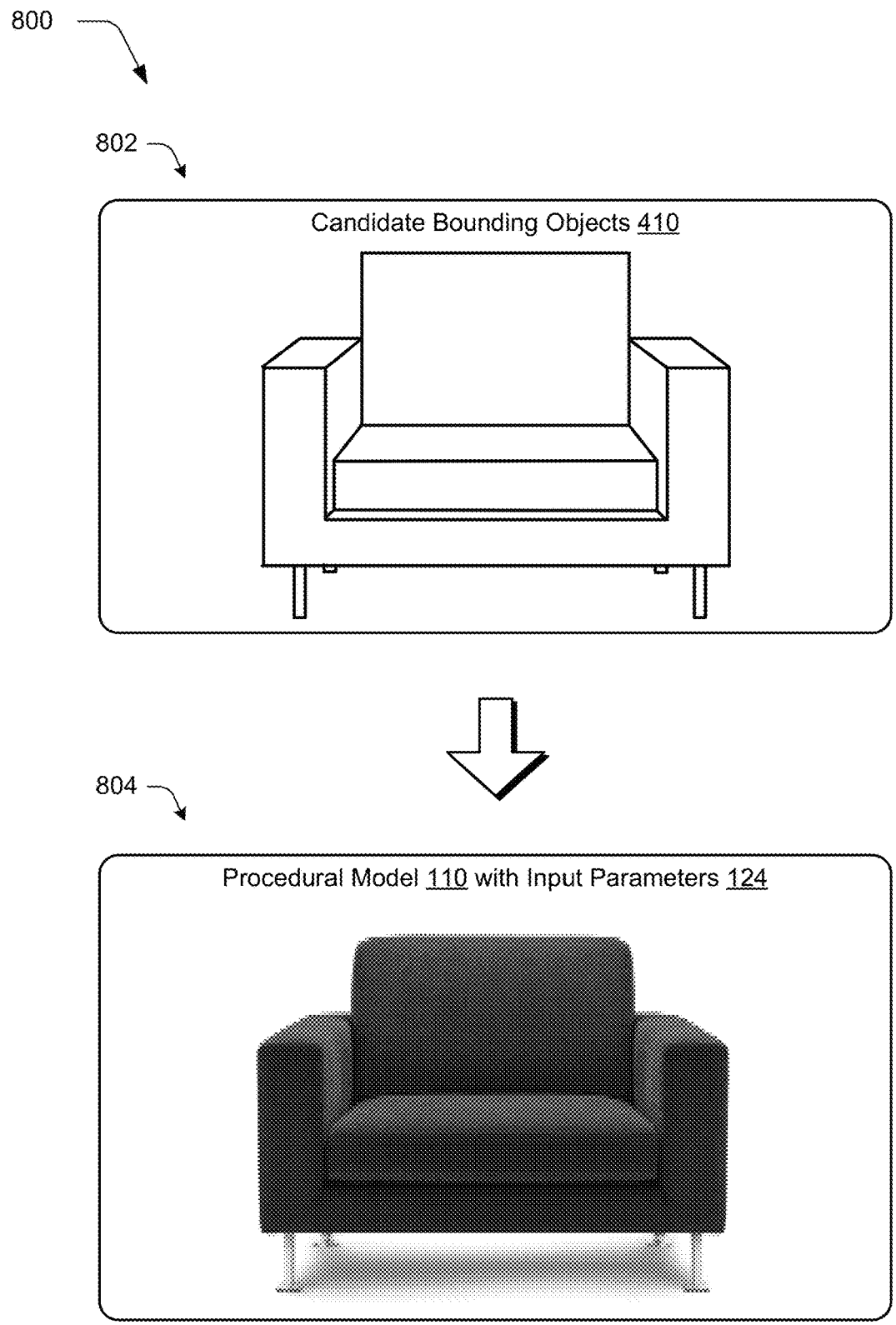
FIG. 8 depicting an example of generating candidate bounding objects as part of an optimization function in order to select input parameters
Figure 9:
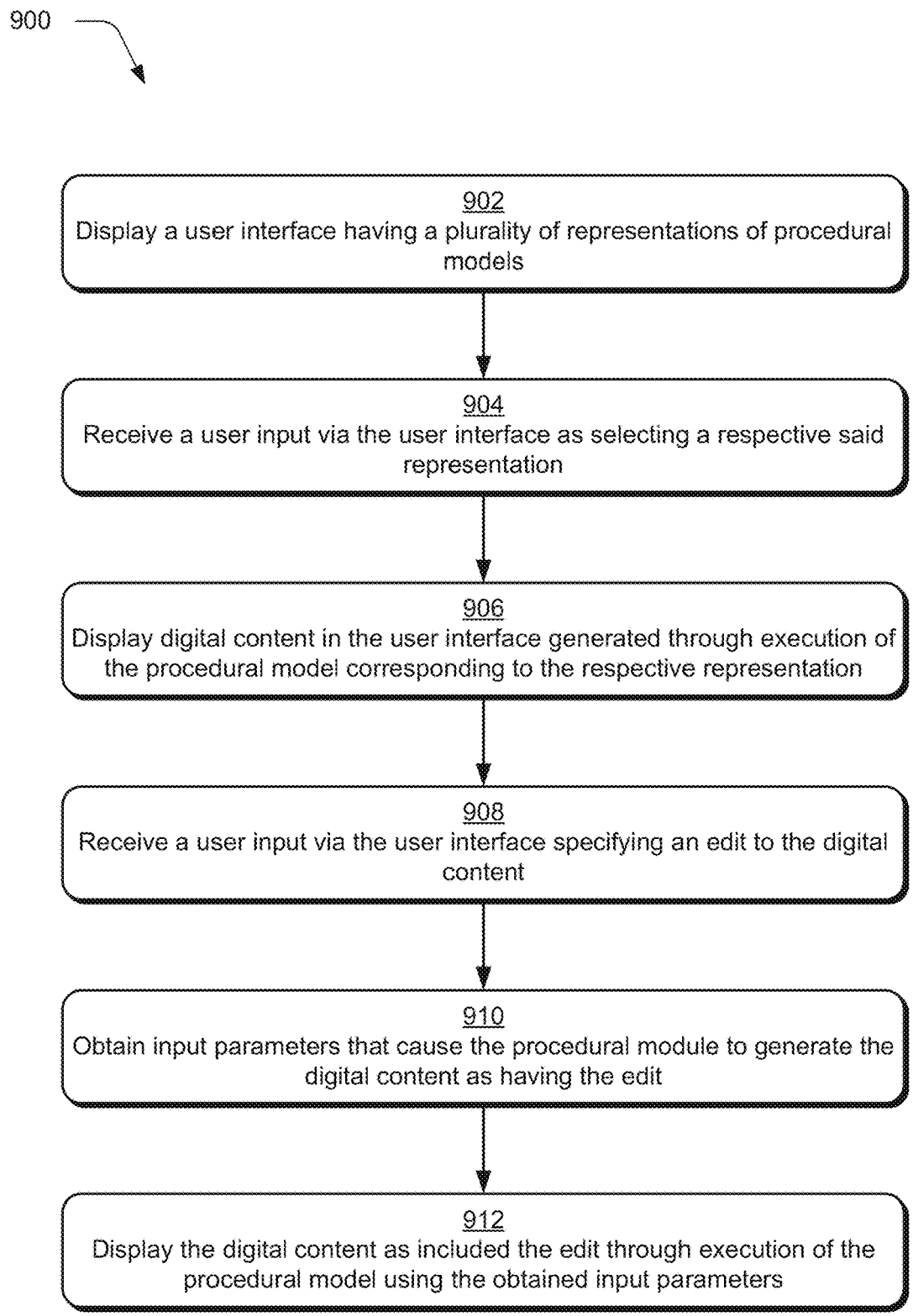
FIG. 9 is a flow diagram depicting a procedure in an example implementation in which input parameters are obtained to cause an edit to digital content generated by a procedural model.
Figure 10:
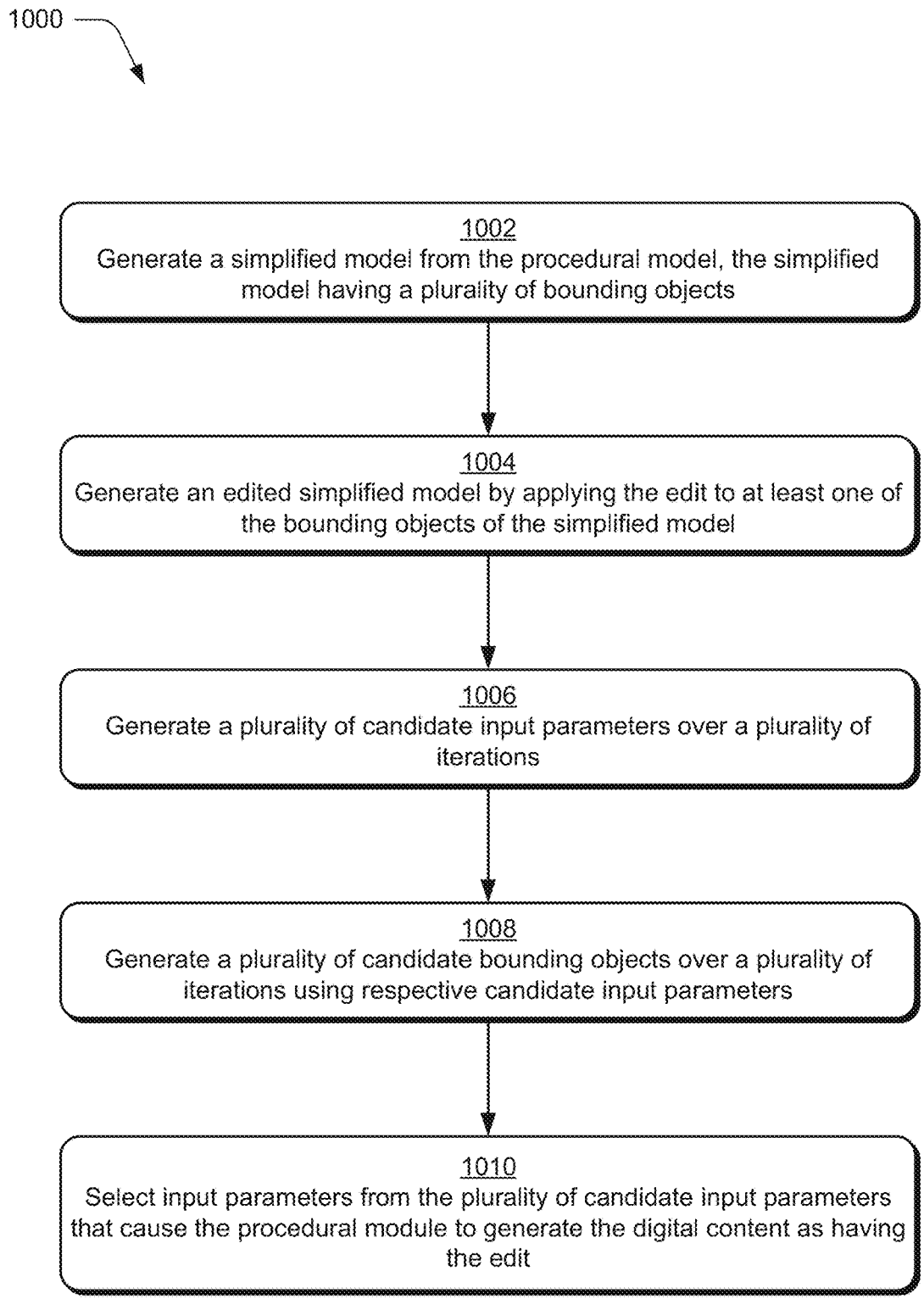
FIG. 10 is a flow diagram depicting a procedure in an example implementation showing generation of the input parameters in greater detail.

FIG. 6 depicts an example 600 of generation of a simplified model from a procedural model. FIG. 7 depicts an example 700 of edit tracking using the simplified model of FIG. 6. FIG. 8 depicting an example 800 of generating candidate bounding boxes as part of an optimization function in order to select input parameters FIG. 9 is a flow diagram depicting a procedure 900 in an example implementation in which input parameters are obtained to cause an edit to digital content generated by a procedural model. FIG. 10 is a flow diagram depicting a procedure 1000 in an example implementation showing generation of the input parameters in greater detail.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

To begin in this example, the digital content system 118 of the computing device 104 accesses the service provider system 102 via the network 106. A digital content manager module 128 of the service provider system 102 implements a platform, via which, digital content 108 generated through use of procedural models 110 is made available, e.g., as part of a subscription, pay-per-use, and so forth. As shown in FIG. 2, for instance, a user interface 114 is displayed having a plurality of representations 202-212 of procedural models (block 902), which in this instance are models of couches having different designs.

A user input is then received via the user interface 114 as selecting a respective representation (block 904), e.g., for licensing via a user's account with the digital content manager module 128. The user input, for instance, selects a representation 210 of digital content that appears the closest to digital content desired for use by a content creator. Using the techniques as described herein, the digital content 108 is then edited without changing an underlying procedural model 110 used to generate the digital content 108 by determining input parameters to the procedural model 110 that cause the digital content 108 to incorporate the edit.

The digital content 110 is displayed in the user interface 114 as generated through execution of the procedural module 110 corresponding to the respective representation (block 906). As previously described, the procedural module 110 includes a collection of nodes 302 that have executable operations (e.g., algorithms) to generate digital content using default parameters, which results in the display of the digital content as depicted at a first stage 602 of FIG. 6.

A content creator can then interact with the digital content 108 via the user interface 114 to specify an edit, which is received by the inverse procedural model system 120 as a user input (block 908) and used by the system to obtain input parameters 124 that cause the procedural model to generate the digital content as having the edit (block 910). To do so in this example the inverse procedural model system 120 employs simplified models to increase computational efficiency and support real time output and user interaction.

The procedural model 110 selected by the user from the service provider system 102 is received as an input by the inverse procedural model system 120. The procedural model 110 has a plurality of nodes 302 that are executable to generate corresponding objects of the digital content 108, e.g., the arms, cushions, back, base, and legs of the couch. The procedural model 110 is processed by a simplified model generation module 304 to generate a simplified model 306 having bounding objects 308 that replace those objects in the procedural model, with corresponding labels 310 (block 1002). The simplified model generation module 304, for instance, generates oriented bounding boxes that contain respective objects therein with labels 310 taken from the nodes 302 of the procedural model 110. These bounding objects 308 act to simply processing over the hundreds and thousands of possible iterations by removing data that is not salient in the determination of the input parameters, e.g., processing, colors, textures, and so on. An example of the simplified model 306 and associated bounding objects 308 is illustrated at a second stage 604 of FIG. 6.

The simplified model 306 is then used by an edit tracking module 312 to track proposed edits received from a user to edit the digital content. A user input 122, for instance, is received by a user input module 314. As shown in an example at a first stage 702 of FIG. 7, the user input 122 specifies that a couch cushion is to be resized through interaction with digital content generated through execution of the procedural model 110. However, rather than make the change to the procedural model 110, a procedural model component tracking module 316 is used to identify a label 310 corresponding to the object (e.g., the cushion) and editing data 318 that describes the change to be made to the object. A simplified model translation module 320 is then employed to apply the editing data 318 to respective bounding objects 308 of the simplified model 306 based on the label 310 in order to generate an edited simplified model 322 having an edited bounding object 324 (block 1004). As shown at a second stage 704 of FIG. 7, this edit is reflected as costs 706, 708 to be minimized as part of generating input parameters 124 by an input parameter generation module 326.

The input parameter generation module 326, for instance, employs a candidate parameter generation module 402 that generates candidate input parameters 404 of a plurality of iterations (block 1006) to incorporate the edit along with other objects included in the digital content 108 that minimizes the costs 706, 708. In practice, thousands of iterations may be performed in order to obtain the input parameters. To address this and improve processing efficiency, an auto differentiation module 406 is employed by the inverse procedural model system. In an example of audio differentiation, mathematical operations between the input variable are recorded in an expression tree. By traversing this tree from a top-level (with an output variable as a root node) to a bottom level (input variables as the leaf nodes), the contribution of each branch on the derivatives of the output variable is computed with respect to the input variables. As a result, auto differentiation provides increased insight and acts as a guide in determining which specific parameters are to be generated in order to achieve a desired result, e.g., the edit and the effect of the edit on other objects included in the digital content 108. In practice, use of auto differentiation has made generating and processing these iterations five to six times faster.

The candidate input parameters 404 are then used by a candidate bounding object generation module 408 to generate candidate bounding objects 410 (block 1008) using the simplified model 306. The candidate bounding objects 410 are then processed in comparison with the editing bounding object 324 of the edited simplified model 324 by a distance determination module 412 using an optimization function 414. This is used as feedback to the candidate parameter generation module 402 to adjust the parameters in such a way that a distance between the candidate bounding objects 410 and the "target" of the edited bounding object 324 are minimized.

As shown at a first stage of FIG. 8, the candidate bounding objects 410 are generated to incorporate the edit and minimize the costs 706, 708 by shortening the backrest and by moving the arms and legs in toward the shortened cushion. As a result, the candidate input parameters 404 adjust the candidate bounding objects 410 over iterations such that everything "fits together" by minimizing the costs. Input parameters 124 are therefore selected from the plurality of candidate input parameters 404 that cause the procedural model 110 to generate the digital content 108 as having the edit (block 1010).

The input parameters 124 are then output to a procedural model output module 126. The input parameters 124, for instance, may be stored by a digital content storage module 502 along with the procedure module 110 as part of the digital content 108 to support rendering of this digital content as edits. The digital content 108, for instance, may include multiple sets of input parameters, e.g., first and second sets 504, 506, that support generation of instances of the digital content that are visually different from the same procedural model 110. A digital content rendering module 508 then implements a procedural engine 510 to execute the procedural model 110 to render the digital content 108 as having the edit (block 912). In this way, the inverse procedural model system 120 employs a simplified model 306 to determine which input parameters are to be used to cause the edit. These input parameters are directly usable by the procedural model 110 to then cause this edit to be reflected by the digital content, an example of which is shown at a second stage 804 of FIG. 8.

Example System and Device

Figure 11:
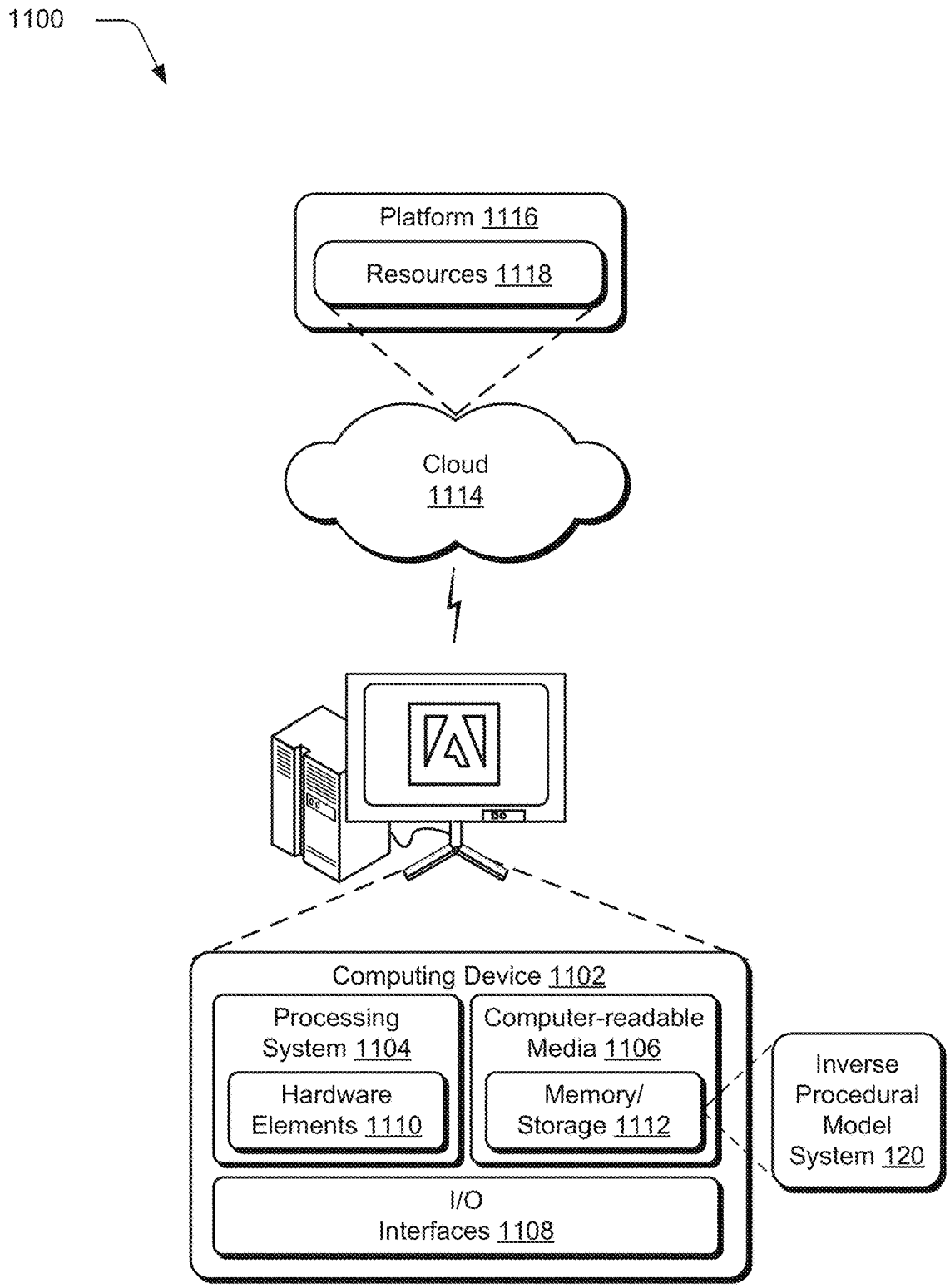
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the inverse procedural model system 120. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   generating, by a processing system, edited digital content that tracks a user input specifying an edit to a dimension of an object depicted by digital content, the digital content including a two-dimensional model or a three-dimensional model generated using a procedural model;
   generating, by the processing system, candidate input parameters over a plurality of iterations using an optimization function that is configured to minimize a distance between digital content generated using the procedural model using the candidate input parameters over the plurality of iterations with the edited digital content and that incorporate the edit to the digital content and remove data that is not salient to determining the candidate input parameters;
   comparing, by the processing system, digital content generated using the procedural model using the candidate input parameters over the plurality of iterations with the edited digital content;
   selecting, by the processing system, input parameters from the candidate input parameters from a respective said iteration that cause the procedural model to generate the digital content as having the edit;
   generating, by the processing system, the digital content as having the edit by executing the procedural model using the input parameters to edit the object; and
   displaying, by the processing system, the digital content as having the edit.

2. The method as described in claim 1, wherein the input parameters cause the digital content generated by the procedural model to include the edit without making a change to the procedural model, itself.

3. The method as described in claim 1, further comprising:
   generating a simplified model from the procedural model, the simplified model having a plurality of bounding objects;
   generating an edited simplified model by applying the edit to at least one of the bounding objects of the simplified model; and
   generating a plurality of candidate bounding objects over a plurality of iterations using respective said candidate input parameters, and wherein the selecting of the input parameters is based on a comparison of the plurality of candidate bounding objects and the bounding objects of the edited simplified model.

4. The method as described in claim 3, wherein the edit is tracked by applying the edit to the at least one of the bounding objects.

5. The method as described in claim 3, wherein the comparison is based on a distance between the plurality of candidate bounding objects and bounding objects of the edited simplified model and the selecting is performed to minimize the distance.

6. The method of claim 3, wherein the simplified model approximates an outer boundary of the object.

7. The method as described in claim 1, wherein the generating the plurality of candidate input parameters over the plurality of iterations is performed using an auto differentiation function.

8. A non-transitory computer-readable storage medium storing executable instructions, which when executed by a processing device, cause the processing device to perform operations comprising:
   receiving a user input specifying an edit to a dimension of an object depicted by digital content generated using a procedural model;
   generating a plurality of candidate input parameters over a plurality of iterations using an optimization function that is configured to minimize a distance between digital content generated using the procedural model using the candidate input parameters over the plurality of iterations with the edited digital content and that incorporate the edit to the digital content and remove data that is not salient to determining the candidate input parameters;
   selecting input parameters from the plurality of candidate input parameters that cause the procedural model to generate the digital content as having the edit;
   generating the digital content as having the edit by executing the procedural model using the input parameters to edit the object; and
   displaying the digital content as having the edit.

9. The non-transitory computer-readable storage medium of claim 8, wherein the input parameters cause the digital content generated by the procedural model to include the edit without making a change to the procedural model, itself.

10. The non-transitory computer-readable storage medium of claim 8, further comprising:
   generating a simplified model from the procedural model, the simplified model having a plurality of bounding objects;
   generating an edited simplified model by applying the edit to at least one of the bounding objects of the simplified model; and
   generating a plurality of candidate bounding objects over a plurality of iterations using respective said candidate input parameters, and wherein the selecting of the input parameters is based on a comparison of the plurality of candidate bounding objects and the bounding objects of the edited simplified model.

11. The non-transitory computer-readable storage medium of claim 10, wherein the edit is tracked by applying the edit to the at least one of the bounding objects.

12. The non-transitory computer-readable storage medium of claim 10, wherein the comparison is based on a distance between the plurality of candidate bounding objects and bounding objects of the edited simplified model and the selecting is performed to minimize the distance.

13. The non-transitory computer-readable storage medium of claim 8, wherein the generating the plurality of candidate input parameters over the plurality of iterations is performed using an auto differentiation function.

14. The non-transitory computer-readable storage medium of claim 8, wherein the edit to the digital content includes an affine transformation.

15. A system comprising:
   a user input module implemented at least partially in hardware of a processing device to receive a user input specifying an edit to a dimension of an object depicted by digital content, the digital content generated using a procedural model;
   a candidate parameter generation module implemented at least partially in hardware of the processing device to generate a plurality of candidate input parameters over a plurality of iterations using an optimization function that is configured to minimize a distance between digital content generated using the procedural model using the candidate input parameters over the plurality of iterations with the edited digital content and that incorporate the edit to the digital content and remove data that is not salient to determining the candidate input parameters;
   a distance determination module implemented at least partially in hardware of the processing device to:
      compare digital content generated using the procedural model using the candidate input parameters over the plurality of iterations with the edited digital content; and
      select input parameters from the candidate input parameters from a respective said iteration that cause the procedural model to generate the digital content as having the edit; and
   a procedural model output module implemented at least partially in hardware of the processing device to generate the digital content as having the edit by executing the procedural model using the input parameters to edit the object.

16. The system as described in claim 15, wherein the input parameters cause the digital content generated by the procedural model to include the edit without making a change to the procedural model, itself.

17. The system as described in claim 15, further comprising:
   a simplified model generation module to generate a simplified model from the procedural model, the simplified model having a plurality of bounding objects;
   a simplified model translation module to generate an edited simplified model by applying the edit to at least one of the bounding objects of the simplified model; and
   a candidate bounding object generation module to generate a plurality of candidate bounding objects over a plurality of iterations using respective said candidate input parameters, and wherein the distance determination module is configured to select the input parameters is based on a comparison of the plurality of candidate bounding objects and the bounding objects of the edited simplified model.

18. The system as described in claim 17, wherein the edit is tracked by applying the edit to the at least one of the bounding objects.

19. The system as described in claim 17, wherein the comparison by the candidate parameter generation module is based on a distance between the plurality of candidate bounding objects and bounding objects of the edited simplified model and the selecting by the distance determination module is performed to minimize the distance.

20. The system as described in claim 15, wherein the edit to the digital content includes an affine transformation.

* * * * *